(12) United States Patent
Kodati et al.

(10) Patent No.: US 12,187,437 B2
(45) Date of Patent: Jan. 7, 2025

(54) ECONOMY CLASS PASSENGER SEAT WITH BED MODE AND REMOVABLE CUSHION

(71) Applicant: B/E Aerospace, Inc., Winston-Salem, NC (US)

(72) Inventors: Sambasiva Rao Kodati, Vinjaram (IN); Gudla Chandra Sekhar, Hyderabad (IN)

(73) Assignee: B/E Aerospace, Inc., Winston-Salem, NC (US)

(*) Notice: Subject to any disclaimer, the term of this patent is extended or adjusted under 35 U.S.C. 154(b) by 156 days.

(21) Appl. No.: 17/872,874

(22) Filed: Jul. 25, 2022

(65) Prior Publication Data
US 2023/0391455 A1 Dec. 7, 2023

(30) Foreign Application Priority Data
Jun. 1, 2022 (IN) .............................. 202241031495

(51) Int. Cl.
*B64D 11/06* (2006.01)
(52) U.S. Cl.
CPC ................................ *B64D 11/0641* (2014.12)
(58) Field of Classification Search
CPC .. B64D 11/0641; B64D 11/0639; B60N 2/34; B60N 2/345; B60N 2/919; A47C 17/13
See application file for complete search history.

(56) References Cited

U.S. PATENT DOCUMENTS

| | | | |
|---|---|---|---|
| 6,397,411 B1* | 6/2002 | Messina | .................. A47C 17/13 |
| | | | 5/55.1 |
| 8,783,771 B2 | 7/2014 | Oleson | |
| 9,056,683 B2 | 6/2015 | Cho | |
| 9,650,145 B2 | 5/2017 | Lambert | |
| 10,723,461 B2 | 7/2020 | Cornell | |
| 10,940,948 B2 | 3/2021 | Verny et al. | |
| 11,059,589 B2 | 7/2021 | Oleson et al. | |
| 11,299,278 B1* | 4/2022 | Malecha | .................. B60N 2/34 |
| 2010/0140010 A1 | 6/2010 | Hollenbeck et al. | |
| 2012/0200125 A1 | 8/2012 | Achilles | |
| 2013/0054279 A1 | 2/2013 | Sharp et al. | |

(Continued)

FOREIGN PATENT DOCUMENTS

| | | |
|---|---|---|
| EP | 3078594 B1 | 8/2018 |
| JP | S5527435 U | 2/1980 |

OTHER PUBLICATIONS

European Search Report dated Oct. 12, 2023; European Application No. 23175812.9.

*Primary Examiner* — Joshua J Michener
*Assistant Examiner* — Arfan Y. Sinaki
(74) *Attorney, Agent, or Firm* — Suiter Swantz IP

(57) ABSTRACT

A passenger seat row for a vehicle such as a passenger aircraft. The passenger seat row includes at least two passenger seats attached to a common frame. Each of the at least two passenger seats includes a backrest forming a recess on a front of the backrest, a cushion removably disposed in the recess, and a seat pan including a fixed frame and a moving frame movably coupled to the fixed frame. In a taxi, takeoff and landing (TTOL) mode the moving frames are retracted relative to the fixed frames and the cushions are disposed in the recess. In a bed mode the moving frames are extended relative to the fixed frames and the cushions are positioned atop the fixed frames.

11 Claims, 11 Drawing Sheets

(56) References Cited

U.S. PATENT DOCUMENTS

| | | |
|---|---|---|
| 2014/0265513 A1 | 9/2014 | Lambert |
| 2016/0031561 A1 | 2/2016 | Bamford et al. |
| 2016/0325838 A1* | 11/2016 | Erhel .................. B60N 2/34 |
| 2020/0385126 A1 | 12/2020 | Ward |

* cited by examiner

ECONOMY CLASS PASSENGER SEAT WITH BED MODE AND REMOVABLE CUSHION

RELATED APPLICATION AND INCORPORATION BY REFERENCE

This application claims the benefit of India Provisional Application No. 202241031495 filed Jun. 1, 2022 and titled "ECONOMY CLASS PASSENGER SEAT ROW WITH BED MODE," the entirety of which is incorporated by reference.

TECHNICAL FIELD AND BACKGROUND

The present disclosure relates generally to aircraft passenger seats, and more particularly to an economy class passenger seat row configured to achieve an in-flight bed mode.

Passenger aircraft typically include different seating classes. Economy classes are characterized by rows of attached seats and a seat pitch that allows for a minimal amount of backrest recline. Premium classes are characterized by separate seats and a greater seat pitch that allows for maximum seat adjustability. For instance, some super premium seats are configured to achieve a horizontal bed during flight.

In the case of long-haul flights, a passenger may desire to purchase an entire economy class seat row for privacy and comfort. In other cases, when a flight is not full, passengers may redistribute throughout the cabin to maximize spacing between passengers. In either case, economy class passenger seat rows do not include a provision to sleep.

Therefore, what is needed is a passenger seat row configured with an in-flight bed mode.

BRIEF SUMMARY

Broadly speaking, the present disclosure provides economy class passenger seat rows configured with an in-flight bed mode.

To achieve the foregoing and other advantages, the inventive aspects disclosed herein are directed to a passenger seat row including at least two passenger seats attached to a common frame. Each passenger seat includes a backrest forming a recess on a front of the backrest, a cushion removably disposed in the recess, and a seat pan including a fixed frame and a moving frame movably coupled to the fixed frame. In a taxi, takeoff and landing (TTOL) mode of the passenger seat row the moving frame of each of the at least two passenger seats is retracted relative to its respective fixed frame and the cushion is disposed in the recess, and in a bed mode of the passenger seat row the moving frame of each of the at least two passenger seats is extended relative to its fixed frame and the cushion is positioned atop its respective fixed frame.

In some embodiments, a length dimension of the cushion is substantially equal to an amount of travel of the moving frame relative to the fixed frame.

In some embodiments, the moving frame translates relative to the fixed frame as the moving frame extends and retracts.

In some embodiments, the fixed frame comprises spaced frame members interconnected by spaced beams and a foraminous plate attached atop the spaced beams, at least one of the spaced frame members defining a rack on an inboard side thereof, and the moving frame comprises spaced frame members interconnected by spaced beams and a foraminous plate attached atop the spaced beams, each of the spaced frame members defining an elongate slot. A forward beam of the spaced beams of the fixed frame is disposed in the elongate slot of each of the spaced frame members of the moving frame for guiding movement of the moving frame relative to the fixed frame.

In some embodiments, the seat row further includes a locking mechanism associated with each of the at least two passenger seats for locking relative motion between the moving frame and the fixed frame.

In some embodiments, the locking mechanism includes a lock configured to interact with the rack on at least one of the frame members of the fixed frame to lock a position of the moving frame relative to the fixed frame, a lever positioned on the moving frame, and a Bowden cable coupled to each of the lock and the lever. In use, pulling the lever causes an inner cable of the Bowden cable to disengage the lock from the rack to permit movement of the moving frame relative to the fixed frame.

In some embodiments, the seat row further includes hook and loop fasteners positioned in the recess, on a bottom side of the cushion, and atop the foraminous plate of at least one of the fixed frame and the moving frame, wherein in use, the hook and loop fasteners secure the cushion in the recess and atop at least one of the fixed frame and the moving frame.

In some embodiments, when in the TTOL mode the moving frame is positioned above the common frame and when in the bed mode the moving frame is positioned forward of the common frame.

In some embodiments, the common frame includes spaced beam tubes supporting the fixed frame of the at least two passenger seats, spreaders forming legs for attachment to a floor, and at least one armrest.

In some embodiments, the passenger seat row includes at least three passenger seats.

In some embodiments, the passenger seat row includes a locking mechanism for locking relative motion of each of the moving frames relative to the respective fixed frames. The locking mechanism includes configured to interact with the racks on at least one of the frame members of each of the fixed frames to lock a position of the moving frames relative to the fixed frames, a singular lever positioned under a forward end of the moving frames, and Bowden cables coupled to each of the locks and to the singular lever. In use, pulling the singular lever causes an inner cable of the Bowden cables to disengage the locks from the racks simultaneously to permit movement of the moving frames relative to the fixed frames.

The inventive aspects disclosed herein are further directed to an aircraft passenger seat including a frame, a backrest attached to the frame and forming a recess on a front of the backrest, a cushion removably disposed in the recess, and a seat pan attached to the frame and including a fixed frame and a moving frame movably coupled to the fixed frame. In a TTOL mode of the aircraft passenger seat the moving frame is retracted relative to the fixed frame and the cushion is disposed in the recess, and in a bed mode of the aircraft passenger seat the moving frame is extended relative to the fixed frame and the cushion is positioned atop the fixed frame.

In some embodiments, the fixed frame includes spaced frame members interconnected by spaced beams and a foraminous plate attached atop the spaced beams, at least one of the spaced frame members defining a rack on an inboard side thereof, and the moving frame includes spaced frame members interconnected by spaced beams and a foraminous plate attached atop the spaced beams, each of the spaced frame members defining an elongate slot receiving of the spaced beams of the fixed frame.

In some embodiments, the passenger seat further includes a locking mechanism for locking a position of the moving frame relative to the fixed frame. The locking mechanism includes a lock configured to interact with the rack on at least one of the frame members of the fixed frame to lock a position of the moving frame relative to the fixed frame, a lever positioned on the moving frame, and a Bowden cable coupled to each of the lock and the lever, wherein in use, pulling the lever causes an inner cable of the Bowden cable to disengage the lock from the rack to permit movement of the moving frame relative to the fixed frame.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

Figure 1:
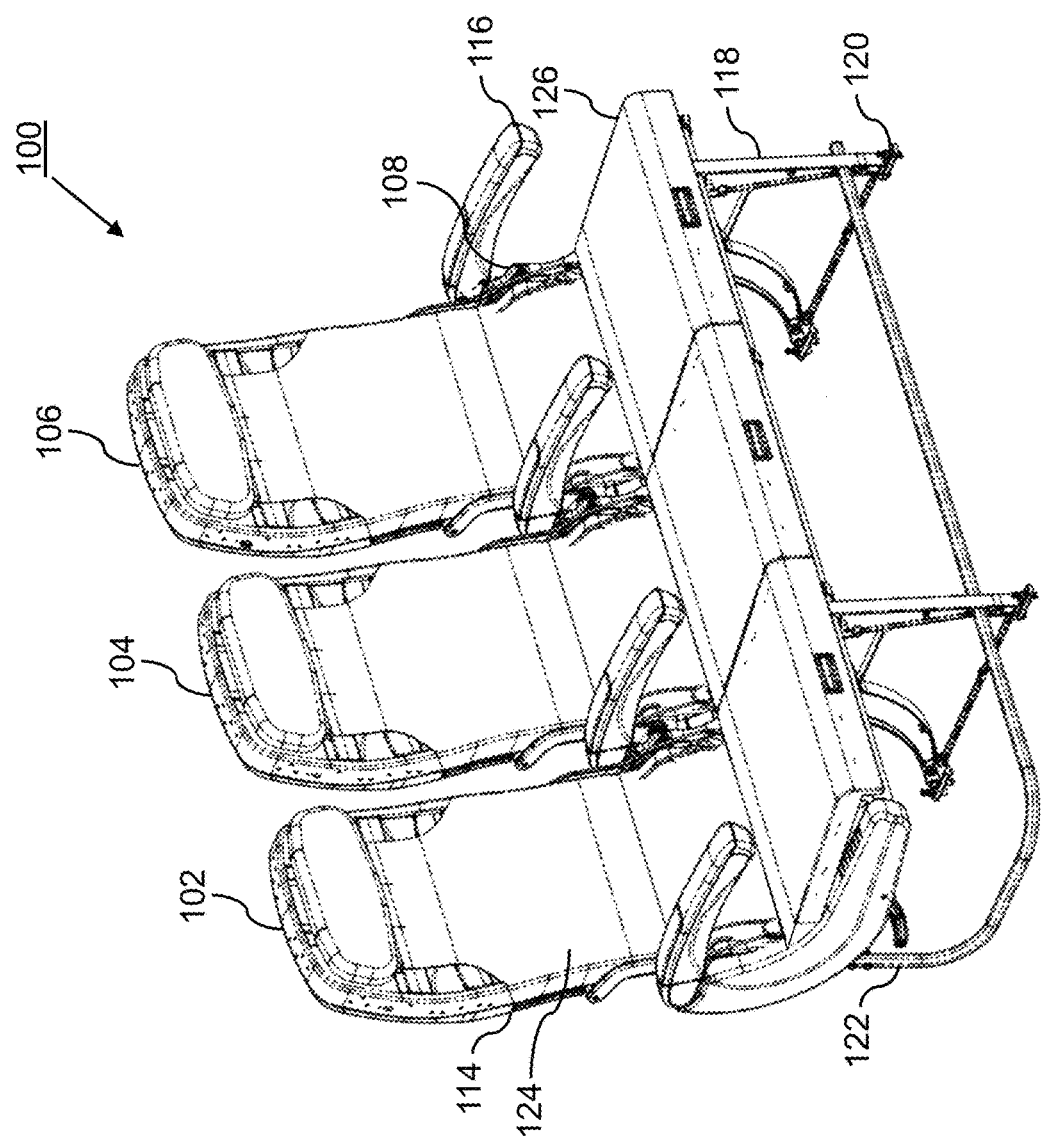
FIG. 1 shows an isometric view of a passenger seat row according to the present disclosure and in a taxi, takeoff and landing (TTOL) mode.
Figure 2:
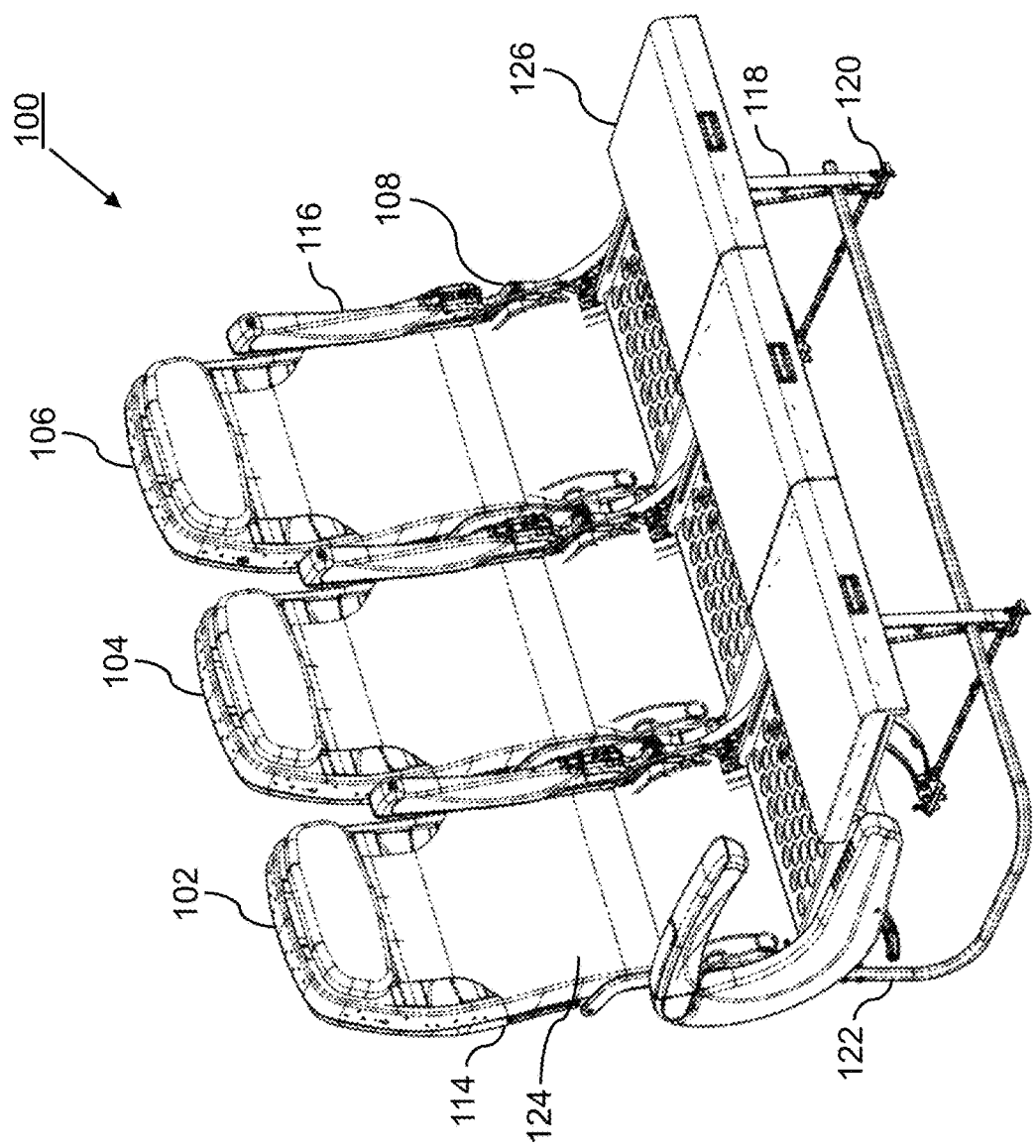
FIG. 2 shows the passenger seat row of FIG. 1 in a partially converted mode.
Figure 3:
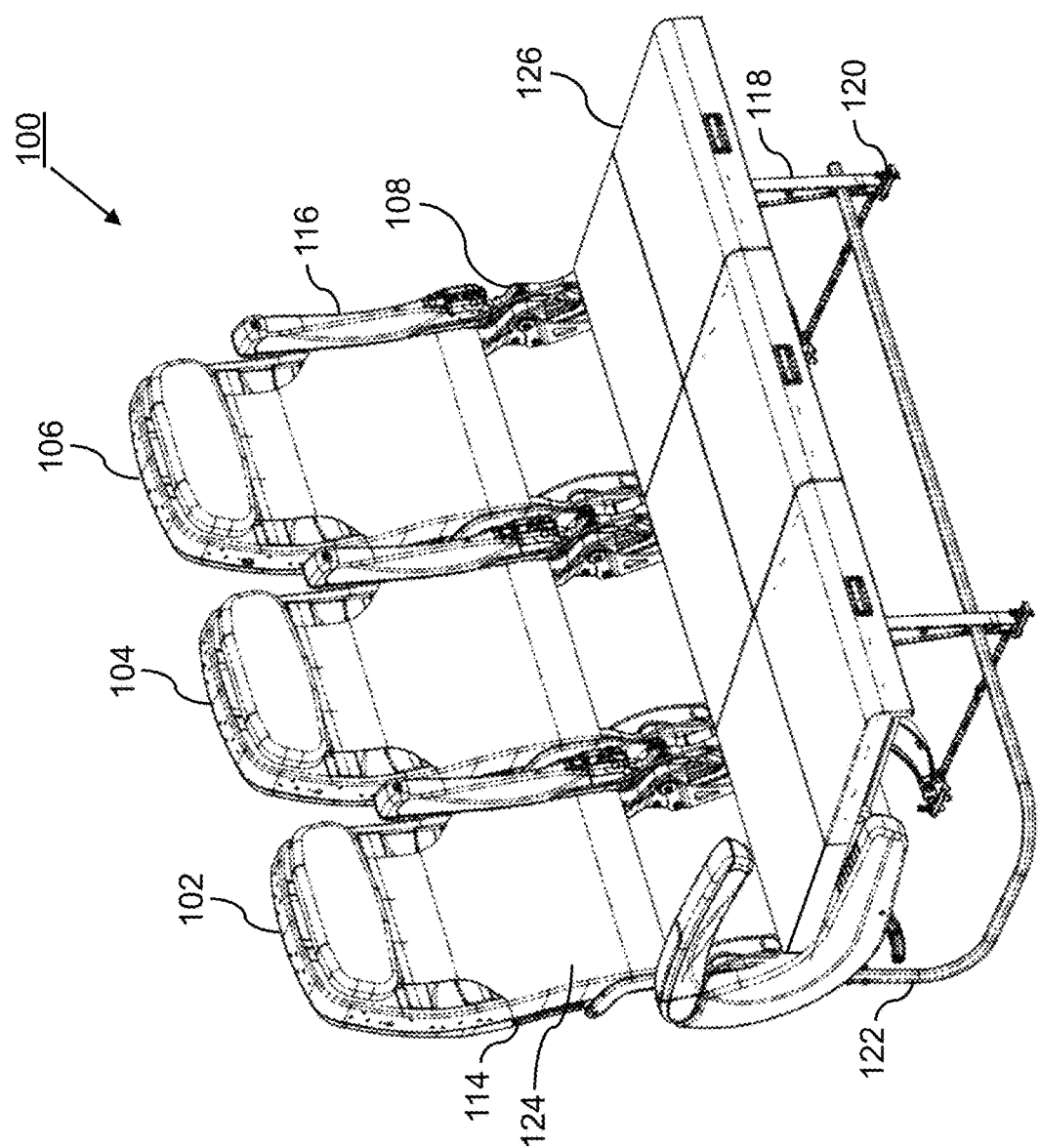
FIG. 3 shows the passenger seat row of FIG. 1 in an in-flight bed mode.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Broadly speaking, the present disclosure provides embodiments of passenger seats and passenger seat rows configured to adjust between an upright sitting mode and a bed mode. When implemented in an aircraft, the upright sitting mode may correspond to a taxi, takeoff and landing mode in which the seat pan is retracted and the backrest is fully upright or reclined. When the seat embodiments are equipped with backrest recline, the seat pan motions described herein may be independent of the backrest recline mechanism and other mechanisms of the seat. When implemented as a passenger seat row, the row includes at least two, and preferably at least three laterally adjacent passenger seats to provide an adequate bed length.

Referring to FIGS. 1-4, the passenger seat row 100 shown includes three laterally adjacent passenger seats 102, 104, 106 attached to a common frame 108. As used herein, the term "common" means shared and not ordinary, and common may mean at least one of the elements of the frame 108 is shared by at least two of the seats. The frame 108 generally includes spaced beam tubes 110 extending the length of the seat row, spreaders 112 positioned at the lateral extents of the seat row and between adjacent seats, backrest frames 114 pivotally attached to the spreaders or another frame element, and armrests 116 positioned at the lateral extents of the seat row and between adjacent seats. The armrests 116 are preferably configured to pivot between stowed and deployed positions to be stowed during boarding, deplaning, and when the seat row is configured for bed mode. The spreaders may form or be attached to legs 118 for attachment to the floor, such as by way of track fasteners 120. In some embodiments, the frame 108 includes a luggage retention bar 122.

Each passenger seat 102, 104, 106 generally includes a backrest 124 and a seat pan assembly 126, also referred to herein as the seat pan. Each seat within the passenger seat row 100 is configurable, separately or together, between the upright sitting mode shown in FIG. 1 and the bed mode shown in FIG. 3 through an intermediate mode shown in FIG. 2. In the upright sitting or TTOL mode, the seat pan 126 is retracted to position the seat pan above the frame 108. In the bed mode, the seat pan 126 is extended to position the seat pan forward of the frame 108. The seat pan 126 may be inclined toward the forward end for cradling comfort and the seat pan translates between the retracted and extended conditions of the seat pan.

Figure 4:
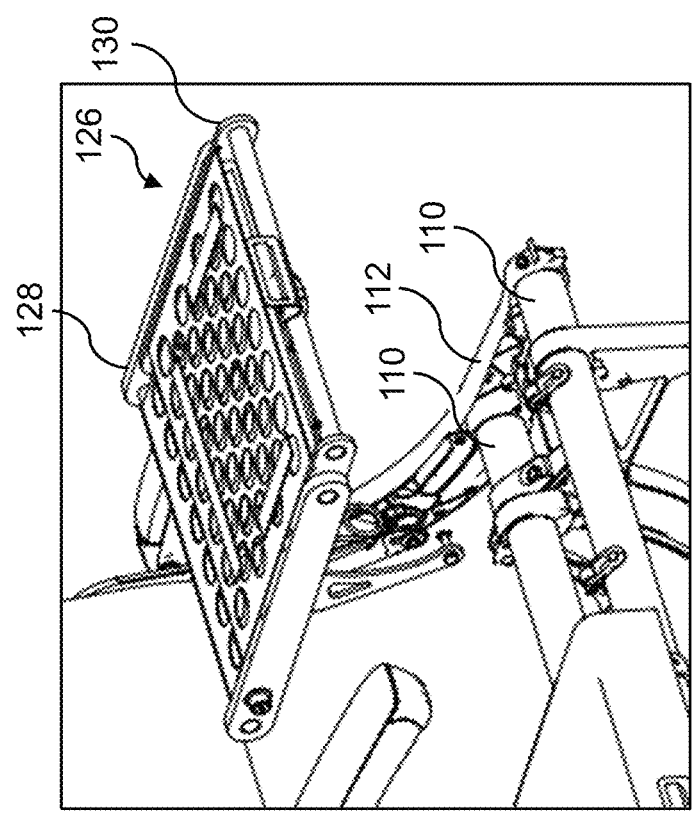
FIG. 4 shows a detailed view of seat pan attachment to a frame.

With specific reference to FIG. 4, the seat pan 126 attaches to the spaced beam tubes 110. As discussed in detail below, the seat pan 126 includes a fixed frame 128 that attaches to the beam tubes and a moving frame 130 that translates relative to the fixed frame, and more particularly, extends forward to achieve the in-flight bed mode and retracts to achieve the TTOL mode. The mechanism for attaching the fixed frame 128 to the beam tubes 110 is not limiting, so long as the fixed frame is maintained fixed relative to the seat frame.

Figure 5:
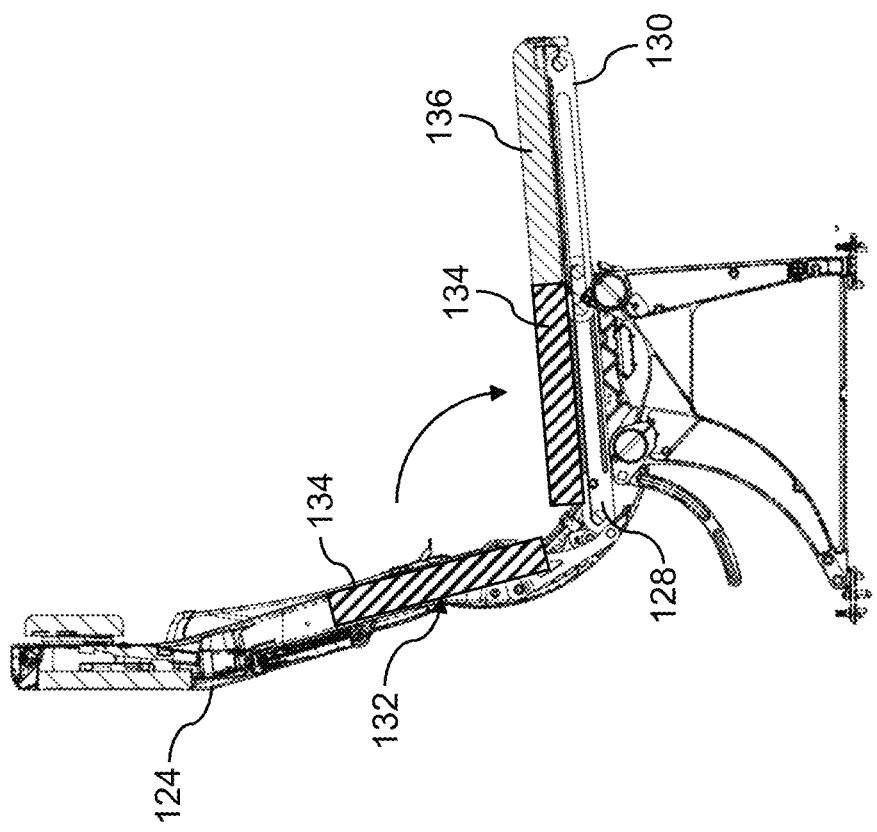
FIG. 5 shows a side view of an individual passenger seat in bed mode and the location of the bed cushion in the backrest.

Referring to FIG. 5, a recess 132 is formed in a front of the backrest 124 and a cushion 134 is removably disposed in the recess 132. When in the TTOL mode, the cushion 134 is positioned in the recess and serves to support the lower back of the seat occupant. When in bed mode, the cushion 134 is removed from the recess 132 and positioned atop the fixed frame 128. In some embodiments, the length dimension of the cushion 134 is approximately equal to the maximum amount of forward travel of the moving frame 130 or is less than the maximum amount of forward travel. As such, when the moving frame 130 is extended to achieve bed mode, the cushion 134 is removed from the backrest and positioned atop the fixed frame 128 to form a continuous bed formed by the repositioned backrest cushion 134 and the seat pan cushion 136 translated forward with the moving frame 130. Thus, the cushion in the backrest is used to form part of the bed cushion. In some embodiments, the cushion 134 can be detached from the backrest and in other embodiments the cushion is pivotally attached to the backrest. In an alternative embodiment, the backrest cushion may not be removable and instead the infill bed cushion is a separate cushion installed by the flight crew.

Figure 6:
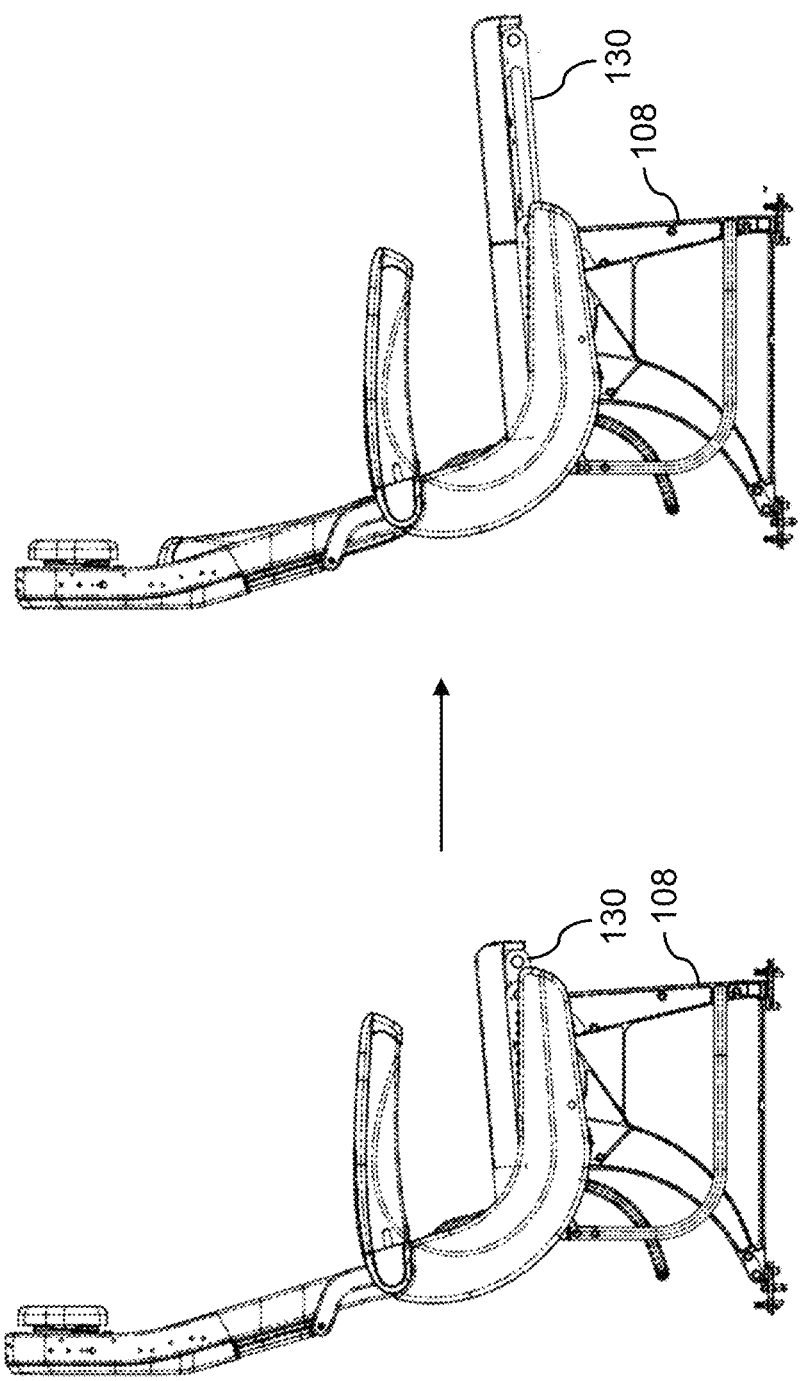
FIG. 6 shows a side elevation view of a passenger seat converted from TTOL mode to bed mode.

FIG. 6 shows the conversion from TTOL mode on the left to the bed mode on the right. When in the TTOL mode the moving frame 130 is positioned above the frame 108. When in the bed mode, the moving frame 130 is positioned forward of the frame 108, for instance cantilevered. The maximum forward travel of the moving frame 130 may be limited by the seat pitch and interference with a forward row or monument.

Figure 7A:
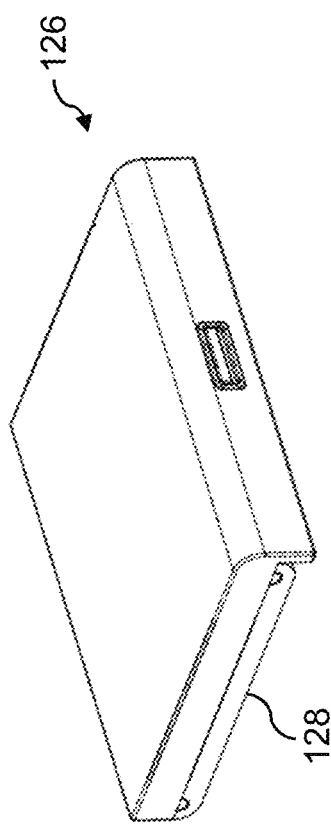
FIGS. 7A and 7B show the seat pan in TTOL mode and bed mode, respectively.
Figure 7B:
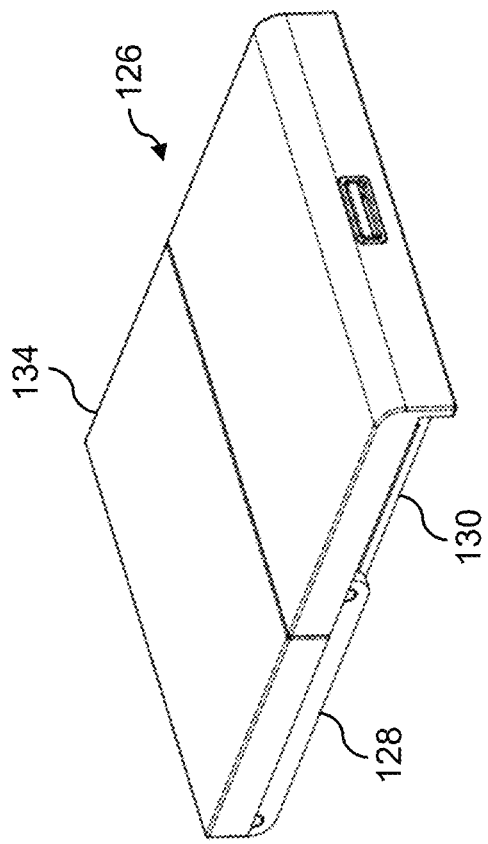
Figure 8A:
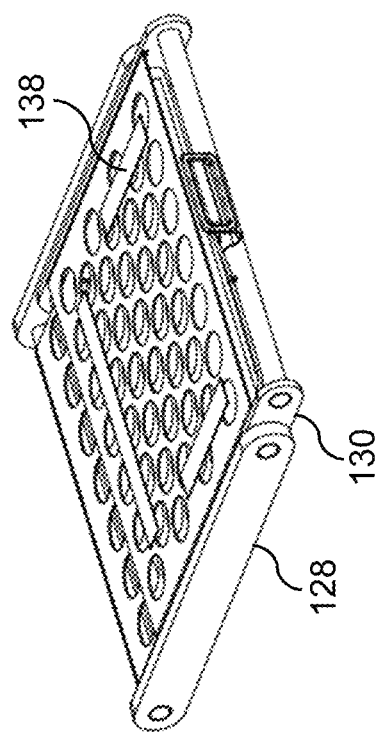
FIGS. 8A and 8B show the seat pan in TTOL mode and bed mode, respectively, and with the cushions removed for clarity.
Figure 8B:
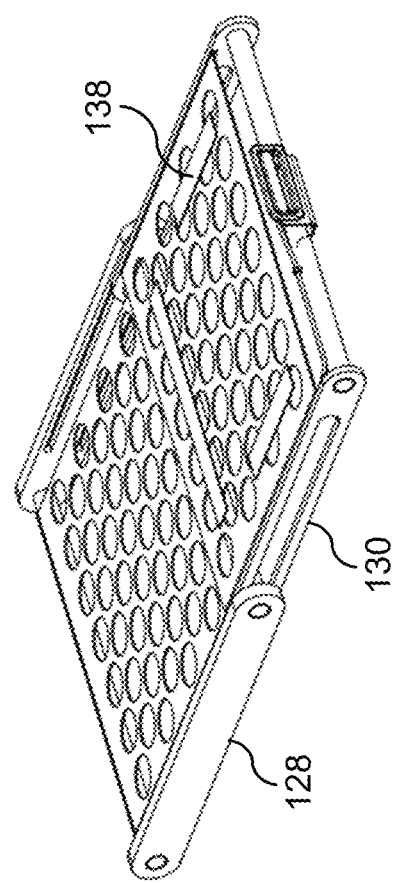
Figure 9B:
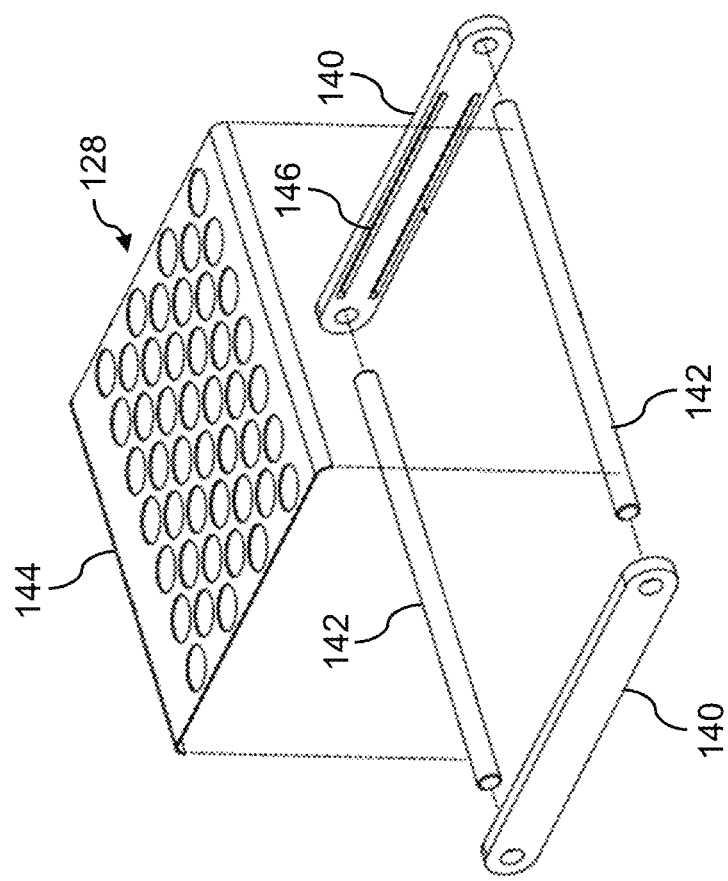
FIG. 9B shows an exploded view of the fixed frame of the seat pan.
Figure 9A:
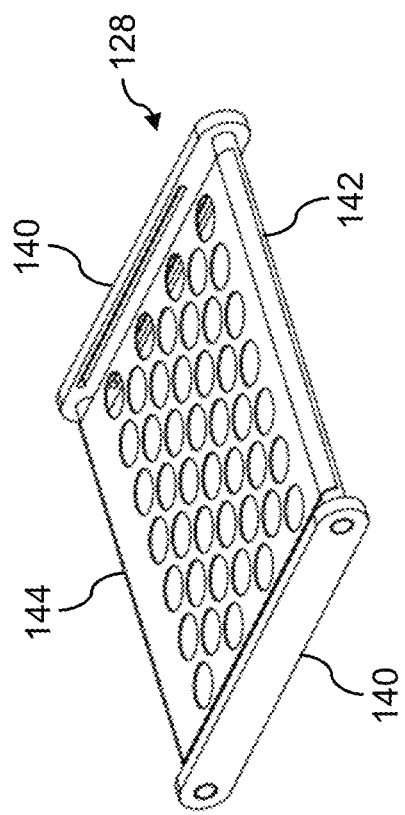
FIG. 9A shows the fixed frame of the seat pan.
Figure 9C:
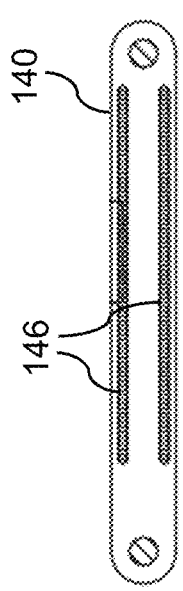
FIG. 9C shows an inside view of a frame member of the fixed frame of the seat pan.
Figure 9D:
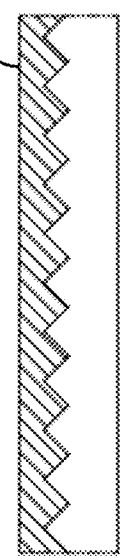
FIG. 9D shows a toother rack of the frame member of FIG. 9C.

Referring to FIGS. 7A and 7B, the seat pan 126 generally includes the fixed frame 128 and the moving frame 130, and the removable backrest cushion 134 attached atop the fixed frame when the moving frame is moved forward to the extended condition shown in FIG. 7B. Referring to FIGS. 8A and 8B, the moving frame 130 translates horizontally or along its angle of inclination relative to the fixed frame 128. Fasteners 138, for instance hook and loop fasteners pairings, function to secure the cushions in place on their respective frame members. A hook and loop fastener pairing may also be used to maintain the cushion in the backrest recess.

Referring to FIGS. 9A-9D, the fixed frame 128 generally includes spaced frame members 140 and interconnecting spaced beams 142. A plate 144, for instance a foraminous plate for weight savings, is attached atop the spaced beams 142. A rack 146 or racks are formed on the inboard side of at least one of the frame members 140 and serves to lock the position of the moving frame relative to the fixed frame 128. In some embodiments, the rack or racks allow for indexing of the moving frame at discrete positions and at predetermined intervals, for example 1-centimeter intervals, less than 1-centimeter intervals, and greater than 1-centimeter intervals.

Figure 10A:
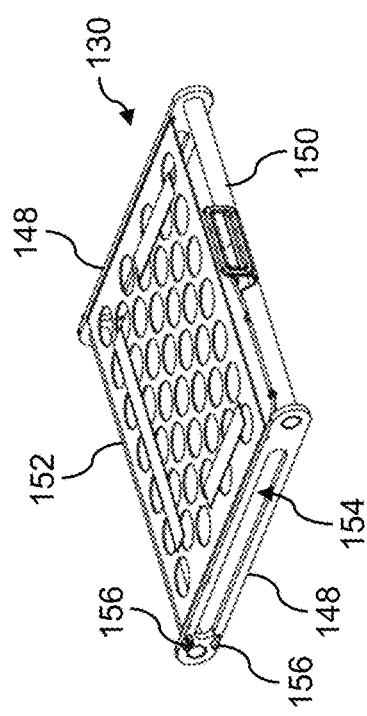
FIG. 10A shows a moving frame of the seat pan.
Figure 10B:
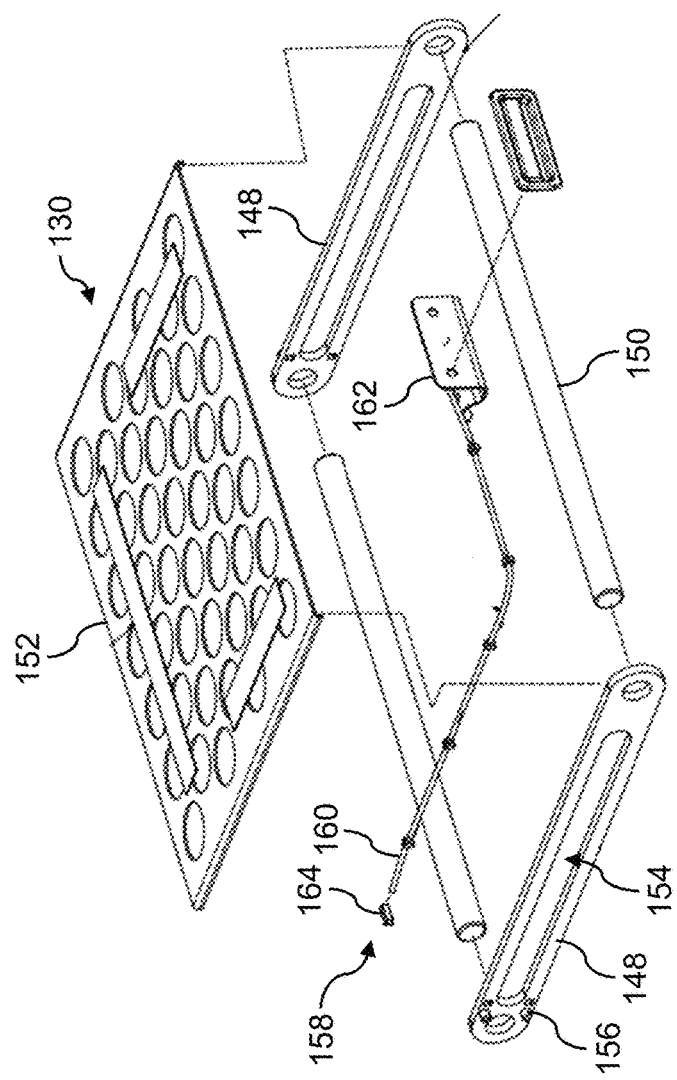
FIG. 10B shows an exploded view of the moving frame of the seat pan.

Referring to FIGS. 10A and 10B, the moving frame 130 generally includes spaced frame members 148, interconnecting spaced beams 150, and a plate 152 positioned atop and attached to the interconnecting spaced beams 150. Each of the spaced frame members 148 defines an elongate longitudinal slot 154 receiving one of the interconnecting spaced beams of the fixed frame, such as the forward beams. Bosses 156 formed on the outboard sides of the spaced frame members 148 travel along the racks formed on the inboard sides of the spaced frame members of fixed frame to guide translating motion and maintain squareness.

In some embodiments, each passenger seat is equipped with a locking mechanism for locking relative movement of the moving frame relative to the fixed frame. With continued reference to FIGS. 10A and 10B, the locking mechanism 158 generally includes a Bowden cable 160 coupled at one end to a lever 162 and coupled at an opposing end to a biased lock 164. The lock 164 interacts with the rack, for instance having a shape complimentary with the rack to engage therewith. The lever 162 is positioned at the forward end of the moving frame 130 to be accessible to the user. The locking mechanism 158 is carried by the moving frame 130 considering the moving frame moves and the fixed frame remains stationary. In use, actuating (e.g., pulling) the lever 162 translates an inner cable relative to an outer cable of the Bowden cable, thereby pulling the lock 164 to disengage the lock from the rack. When the lever is released, the inner cable translates relative to the outer cable in the opposite direction to reengage the lock 164 with the rack. To move the moving frame 130 relative to the fixed frame, the lever remains actuated until the moving frame is in the desired frame and then the lever is released.

Figure 11:
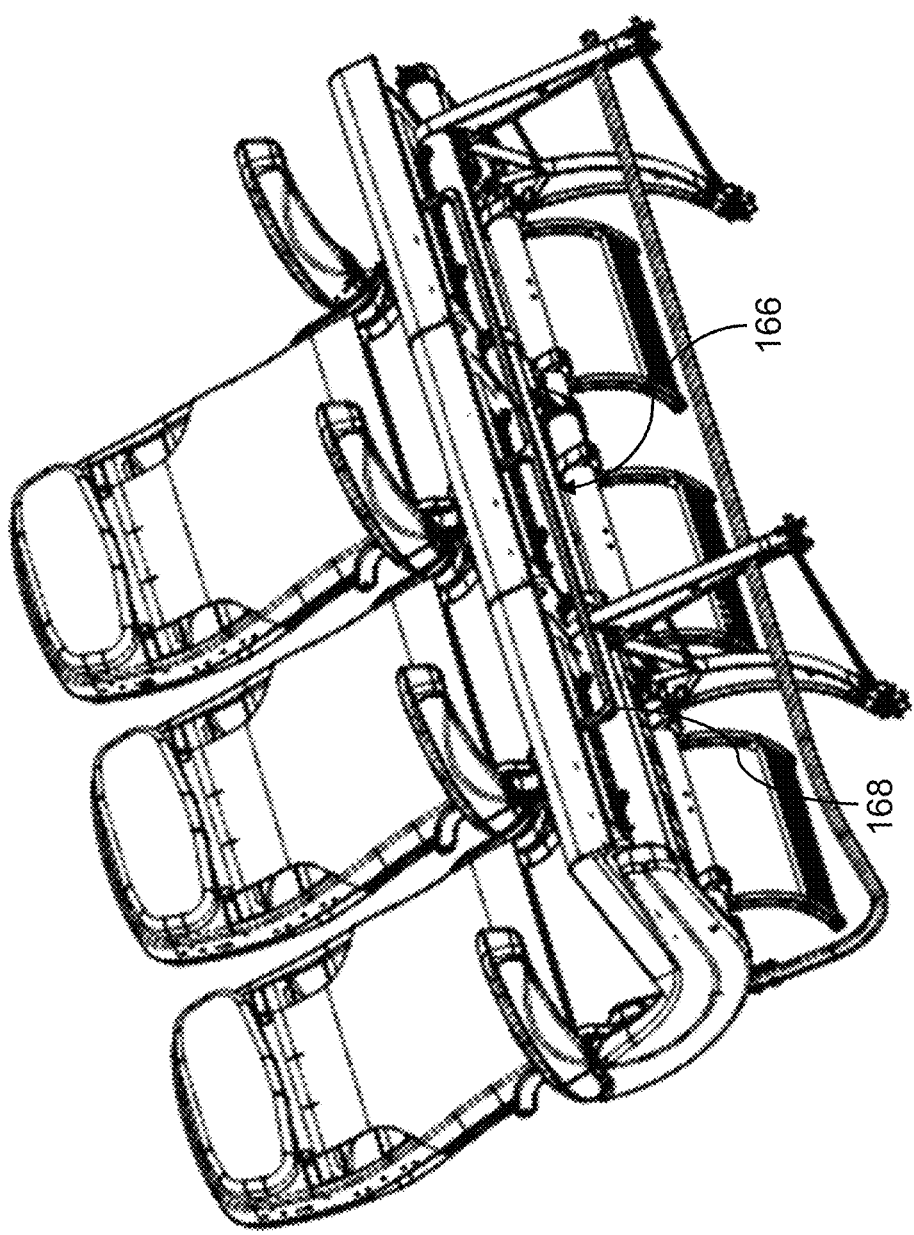
FIG. 11 shows an isometric view of a seat row including a single lever to for actuating seat pan translation.

Referring to FIG. 11, whereas the locking mechanism shown in FIGS. 10A and 10B is associated with each passenger seat, the locking mechanism 166 shown in FIG. 11 includes a singular lever 168 operable for actuating all locks in the same row simultaneously. In some embodiment, the singular lever 168 is an elongate handle positioned below the forward end of the seat pans and is coupled to multiple Bowden cables each coupled to a lock engaging its respective rack. In use, the singular lever 168 is actuated to pull the plurality of internal cables to release the moving frames from their locked positions. To retract the moving frames, i.e., return the moving frame toward their TTOL positions, the singular lever 168 is pulled, the moving frames are pushed toward their retracted positions, and the lever released to lock the moving frames in place. Other locking mechanisms are possible and envisioned including electronic actuators which may be passenger or crew controlled, and in some cases networked to be controllable in preparation for a flight condition.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:
1. A passenger seat row, comprising:
a frame; and
at least two passenger seats attached to the frame, each of the at least two passenger seats comprising:
a backrest forming a recess on a front of the backrest;
a cushion removably disposed in the recess; and
a seat pan including a fixed frame and a moving frame movably coupled to the fixed frame;
wherein:
the fixed frame comprises spaced frame members interconnected by spaced beams and a foraminous plate attached atop the spaced beams, at least one of the spaced frame members defining a rack on an inboard side thereof;
the moving frame comprises spaced frame members interconnected by spaced beams and a foraminous plate attached atop the spaced beams, each of the spaced frame members defining an elongate slot; and
a forward beam of the spaced beams of the fixed frame is disposed in the elongate slot of each of the spaced frame members of the moving frame for guiding movement of the moving frame relative to the fixed frame;
wherein in a taxi, takeoff and landing (TTOL) mode of the passenger seat row, the moving frame of each of the at least two passenger seats is retracted relative to the moving frame's respective fixed frame and the cushion is disposed in the recess; and wherein in a bed mode of the passenger seat row, the moving frame of each of the at least two passenger seats is extended relative to the moving frame's fixed frame and the cushion is positioned atop the moving frame's respective fixed frame.

2. The passenger seat row according to claim 1, wherein a length dimension of the cushion is substantially equal to an amount of travel of the moving frame relative to the fixed frame.

3. The passenger seat row according to claim 1, wherein the moving frame translates relative to the fixed frame as the moving frame extends and retracts.

4. The passenger seat row according to claim 1, further comprising a locking mechanism associated with each of the at least two passenger seats for locking relative motion between the moving frame and the fixed frame.

5. The passenger seat row according to claim 4, wherein the locking mechanism comprises:
- a lock configured to interact with the rack on at least one of the frame members of the fixed frame to lock a position of the moving frame relative to the fixed frame;
- a lever positioned on the moving frame; and
- a Bowden cable coupled to each of the lock and the lever, wherein in use, pulling the lever causes an inner cable of the Bowden cable to disengage the lock from the rack to permit movement of the moving frame relative to the fixed frame.

6. The passenger seat row according to claim 1, wherein:
when in the TTOL mode, the moving frame is positioned above the frame; and
when in the bed mode, the moving frame is positioned forward of the frame.

7. The passenger seat row according to claim 1, wherein the frame comprises:
- spaced beam tubes supporting the fixed frame of the at least two passenger seats;
- spreaders;
- legs; and
- at least one armrest.

8. The passenger seat row according to claim 1, comprising at least three passenger seats.

9. An aircraft passenger seat, comprising:
- a frame;
- a backrest attached to the frame, the backrest forming a recess on a front of the backrest;
- a cushion removably disposed in the recess; and
- a seat pan attached to the frame, the seat pan including a fixed frame and a moving frame movably coupled to the fixed frame;

wherein:
- the fixed frame comprises spaced frame members interconnected by spaced beams and a foraminous plate attached atop the spaced beams, at least one of the spaced frame members defining a rack on an inboard side thereof;
- the moving frame comprises spaced frame members interconnected by spaced beams and a foraminous plate attached atop the spaced beams, each of the spaced frame members defining an elongate slot; and
- a forward beam of the spaced beams of the fixed frame is disposed in the elongate slot of each of the spaced frame members of the moving frame for guiding movement of the moving frame relative to the fixed frame;

wherein in a taxi, takeoff and landing (TTOL) mode of the aircraft passenger seat, the moving frame is retracted relative to the fixed frame and the cushion is disposed in the recess; and wherein in a bed mode of the aircraft passenger seat, the moving frame is extended relative to the fixed frame and the cushion is positioned atop the fixed frame.

10. The aircraft passenger seat according to claim 9, further comprising a locking mechanism for locking relative motion between the moving frame and the fixed frame, the locking mechanism comprising:
- a lock configured to interact with the rack on at least one of the frame members of the fixed frame to lock a position of the moving frame relative to the fixed frame;
- a lever positioned on the moving frame; and
- a Bowden cable coupled to each of the lock and the lever, wherein in use, pulling the lever causes an inner cable of the Bowden cable to disengage the lock from the rack to permit movement of the moving frame relative to the fixed frame.

11. The aircraft passenger seat according to claim 9, wherein:
the moving frame translates relative to the fixed frame;
when in the TTOL mode, the moving frame is positioned above the frame; and
when in the bed mode, the moving frame is positioned forward of the frame.

* * * * *